United States Patent
Bredin

(10) Patent No.: US 7,644,996 B2
(45) Date of Patent: Jan. 12, 2010

(54) SYSTEM AND METHOD FOR MONITORING PARKING BRAKE RELEASE

(75) Inventor: Francis Bredin, Maisons Alfort (FR)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/449,342

(22) Filed: Jun. 8, 2006

(65) Prior Publication Data

US 2007/0016353 A1   Jan. 18, 2007

(30) Foreign Application Priority Data

Jul. 12, 2005 (EP) ................................. 05300573

(51) Int. Cl.
*B60T 17/18* (2006.01)
(52) U.S. Cl. .......................................... 303/89; 303/20
(58) Field of Classification Search ................. 188/265; 303/3, 20, 89
See application file for complete search history.

(56) References Cited

U.S. PATENT DOCUMENTS

| 4,717,207 | A | * | 1/1988 | Kubota et al. | ................... 303/3 |
| 5,667,282 | A | * | 9/1997 | Kim | .............................. 303/3 |
| 2004/0011610 | A1 | * | 1/2004 | Witzler et al. | ............... 188/265 |

* cited by examiner

*Primary Examiner*—Thomas J Williams
(74) *Attorney, Agent, or Firm*—Schmeiser, Olsen & Watts; William H. Steinberg

(57) ABSTRACT

A system and method for controlling the unintended rolling of a rolling stock, the rolling stock having a driver park brake, and an in-vehicle network for signals transmission, the method comprises the steps of selecting among the signals transmitted over the in-vehicle network, a set of predefined signals, then analyzing the status of the selected signals to determine a regulation process to be applied to the rolling stock, and monitoring the regulation process.

6 Claims, 5 Drawing Sheets

SYSTEM AND METHOD FOR MONITORING PARKING BRAKE RELEASE

TECHNICAL FIELD

The present invention relates generally to mobile systems (i.e. rolling stocks systems), and more particularly to a system and method for monitoring parking brake release of such systems.

BACKGROUND

It is known in the art that blocking rolling material against unplanned movement is the basic function of a parking brake. Beyond this basic function it is also desirable that the release phase of the parking brake should operate properly.

Actual driver information systems are planned to be apprehended by the human sense resources that lead the parking brake position to be usually reported by different alarm indicators such as:
1—Fix or/and blinking light with various form factor, size, color and frequency,
2—Fugitive sound effects to warn the driver that the system has not been unlocked before running, and
3—A voice system.

Existing systems present several drawbacks, some of which are listed hereinafter:
  No prompt and dynamic actions are performed based on light or sound indicators;
  Depending on the indicator reliability the driver may or may not be warned by a visual light or a sound system indicating that the brake is or is not in a safe position. The message is delivered by the alarm's indicators and is checked by the driver in order to manually release the vehicle's parking brake.

Operating the rolling stock with unreleased parking brake can irreversibly damage the entire brake system by burning the brake shoes, brake drum, tablets, wheel tread, disc, cable and additional components.

As mentioned above, prior art solutions are not fully appropriated with the newer trends of automotive and cockpit development. Simple indicators, such as blinking lights and sound systems are not efficient enough. The basic vehicle's indicator reporting can be seriously hampered due to some undesirable reasons such as the implementation of music features that leads the cockpit to be both a noisy environment and in a stressed situation. The generation of decibel overflow and the usage of the CD headphones, mobile phone conversation or the equivalent considerably impacts the sound effect alarm reporting. Moreover, the wearing of sunglasses considerably reduces and/or inhibits the feedback given by a visual alarm indicator.

The present invention offers a solution to solve the aforementioned problems.

SUMMARY OF THE INVENTION

Accordingly, a first object of the invention is to provide a secure and reliable system and to achieve a method that is fully compliant with the current improvements of the mechatronics technology (mixing mechanical and electronic concepts).

The disclosed system is compatible with the new generation of automotives, cars, trucks, buses or mobile materials and can be expanded to others particular moving systems such as handicap electronic seats or equivalent.

Another object of the invention is to provide a robust and secure apparatus for monitoring a brake on/off switch mechanism ensuring that all parts involved in the action are completely unlocked before operation.

It is another object of the invention to provide a robust and secure dynamic electronic mechanism along with an interlock control engine system.

According to one embodiment of the invention there is provided a method for controlling unintended rolling of a rolling stock, the rolling stock having at least a driver parking brake, an engine, a plurality of wheels, and further having an in-vehicle network for signals transmission, the method comprising the steps of selecting among the signals transmitted over the in-vehicle network, a set of predefined signals, analyzing the status of the selected signals to determine a regulation process to be applied to the rolling stock, and monitoring the regulation process.

According to another aspect of the invention there is provided a system for controlling unintended rolling of a rolling stock, the rolling stock having at least a driver parking brake, an engine, a plurality of wheels, and further having an in-vehicle network for signals transmission, the system comprising means for selecting among the signals transmitted over the in-vehicle network, a set of predefined signals, means for analyzing the status of the selected signals and for determining a regulation process to be applied to the rolling stock, and means for monitoring the regulation process.

According to yet another aspect of the invention there is provided a computer readable medium for controlling unintended rolling of a rolling stock, the rolling stock having at least a driver parking brake, an engine, a plurality of wheels, and further having an in-vehicle network for signals transmission comprising instructions for selecting among the signals transmitted over the in-vehicle network, a set of predefined signals, analyzing the status of the selected signals to determine a regulation process to be applied to the rolling stock, and monitoring the regulation process.

BRIEF DESCRIPTION OF THE DRAWINGS

The above and other objects, features and advantages of the invention will be better understood by reading the following more detailed description of the invention in conjunction with the accompanying drawings wherein.

DETAILED DESCRIPTION OF THE INVENTION

Some terms used in the detailed description of the present invention are initially described:

Anti-lock braking system (ABS): A vehicle equipped with ABS stops shorter on most roads and offers improved stability and steering capability on all surfaces. Without ABS the brakes and wheels can lock up during a quick stop. ABS can prevent locking and assists in keeping the vehicle under control. It also helps to maintain the vehicle moving in a straight line or can help retaining steering control in adverse situations.

ABS monitors wheel speeds using sensors mounted on each wheel. A computer calculates the slip, or difference between the speed of the wheel and the speed of the vehicle. When it determines that a wheel is about to lock, the computer sends signals to hydraulic valves, which regulate the brake pressure at each wheel to prevent wheel lockup.

Brake-by-wire: Electric brake-by-wire systems stop a vehicle using electromechanical actuators located at the wheels, commanded through electronic signals transmitted from the driver, versus the conventional hydraulic powered systems. The technology will be applied to vehicles with conventional power trains, as well as vehicles with advanced power sources, like hybrid electric, fuel cell and advanced battery electric propulsion.

Electronic Stability Program (ESP): ESP, through electrical sensors strategically placed throughout the vehicle, analyzes steering wheel activity, wheel speeds, acceleration and the vehicle's rotation about its vertical axis (yaw) and continuously compares this data to determine whether the actual course of the vehicle corresponds to the desired direction. Some manufacturer's have named ESP Vehicle Stability Control (VSC).

Controller Area Network (CAN): is a control network protocol that has found wide use in Industrial Automation and in the Automotive Industry. The CAN protocol is a real-time, serial, broadcast protocol that runs up to 1 Mbps. Originally developed by R.BOSCH Gmbh in 1983 for automotive control, it become an ISO standard in 1993 (ISO 11898). The automotive industry uses CAN as the in-vehicle network (IVN) for the engine management, the body electronics like door and roof control, air conditioning, and lightning, as well as for the entertainment control.

Airmatic Dual Control (ADC): ADC works in conjunction with Adaptive Damping System (ADS). This fully automatic electronic system has four different damping levels, which it adjusts at each wheel in accordance with the road surface and the driver's requirements. The result is a smooth ride even over poor road surfaces, without compromise to vehicle stability.

Figure 1:
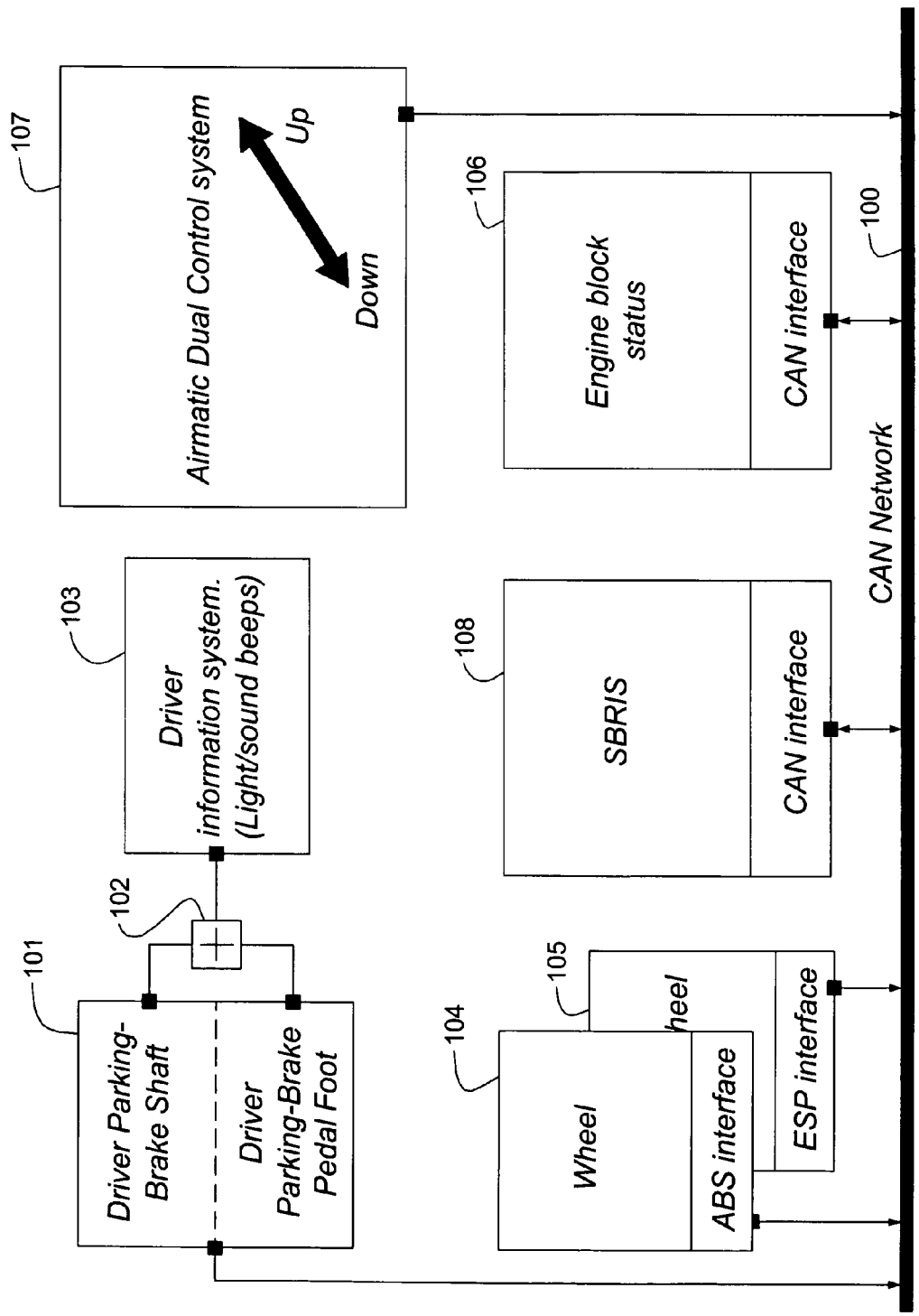
FIG. 1 illustrates a global overview of the system of the present invention.

Referring to FIG. 1, the invention is directed to a dynamic mechanism herein named "Safety Brake Release Interlock Scheme" SBRIS (108) and a method that safely slows and stops a rolling material in case of paramount necessity. In accordance with the automotive embedded electronic devices solutions and features, the invention takes the advantage to be fully flexible and to be easily upgradeable to fit with most current and future automotive requirements.

SBRIS system (108) represents a single integrated modular unit in the rolling stock and can be easily connected to the Control Unit of the vehicle (not shown here) by using a CAN Network (100). The electronics receives all the necessary signals from CAN Network (100) like those coming from ABS or ESP systems (104/105), from an engine block (106) and from a parking brake block (101).

It is to be noted that depending on the vehicle concept the parking brake system can be either activated by the driver parking brake shaft or the driver parking brake foot pedal that can be decoded by using a selector (102). The system can be also implemented in automatic gear box to control the automatic park brake released before running. Even if the automatic gear box is positioned in the "neutral" position the system checks, manages and reports any undesirable movement. A driver information system (103) is coupled to parking brake block (101) via selector (102) to provide the driver with the basic reporting information. However, it can be coupled to CAN Network (100) directly to satisfy another arrangement (not shown here).

Basically, driver information system (103) diagnoses the state of the braking system by activating either a blinking light or some sound beeps to be acknowledged by the driver.

In accordance with another aspect of the invention a hill-up-down position mechanism or Airmatic Dual Control system (107) may be connected to CAN Network (100) to bring additional parameters about the car stability.

SBRIS is fully compatible with the enhanced automotive features known by the person skilled in the art, such as Brake-by-Wire" and "Stop-and-Go" features.

SBRIS is activated when the rolling materiel starts, moves, rolls and when the parking brake is still activated or is not correctly released.

SBRIS may monitor engine gas regulation in case the conception is based on gas energy or alternatively the SBRIS may monitor the electrical speed regulation when the conception is based on battery energy.

Finally, the SBRIS monitors the brake-by-wire system to slow and stop the rolling stock in case of emergency.

Figure 2:
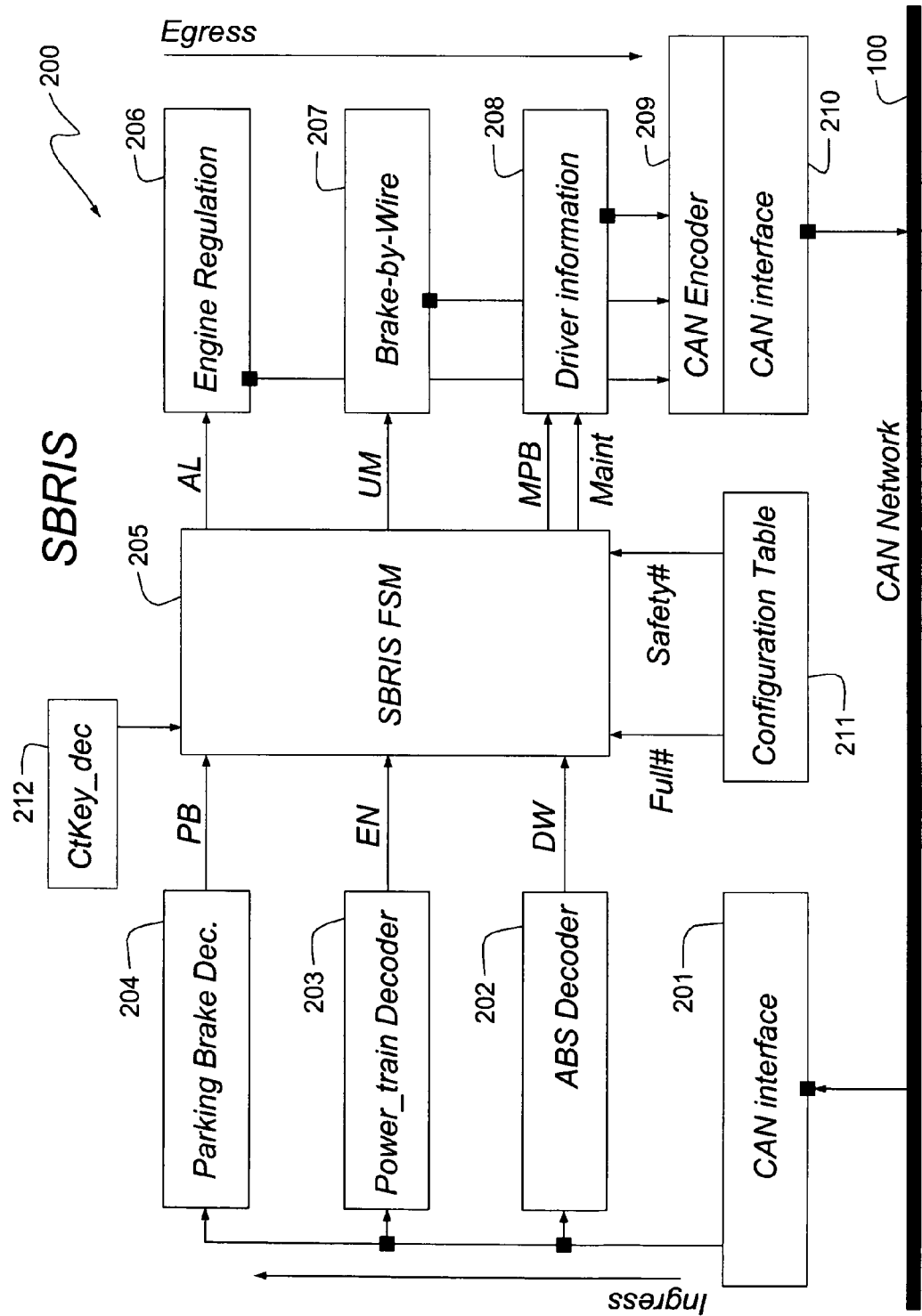
FIG. 2 details a preferred embodiment of the internal SBRIS block of FIG. 1.

Referring to FIG. 2, details of the SBRIS component of FIG. 1 is described. SBRIS (200) comprises a Finite State Machine (FSM) controller (205) coupled to several components (201, 202, 203, 204, 206, 207, 208, 209, 210, 211, 212) described herein below, to monitor and control all the requirements related to the parking brake system and its associated rolling stock.

SBRIS block (200) incorporates a multiplex communication bus interface to receive data at interface (201) and send data at interface (210) provided by FSM controller system (205). SBRIS block (200) can be connected either to a direct electrical connection (like a point-2-point connection; not shown here) or to a bi-directional bus or to a multiplex bus such as CAN Network (100) or any equivalent. The incoming data, qualifiers and traffic information are applied to CAN interface receiver (201) to be pushed into an ingress data flow. Data are processed and all necessary information is output via an egress data flow to the CAN interface driver (210) to be then propagated into the communication bus (the CAN Network as exemplified). Methods and systems to implement such multiplex communication bus 100 are well known in the art and will not be further described.

The ingress data flow propagates through CAN interface receiver (201), an ABS decoder (202), a Power_train Decoder (203), a Parking Brake Decoder (204) and a Configuration Table (211). CAN interface receiver (201) is coupled to Configuration Table (211) to provide initialization parameters such as a Power_On_Reset (POR) signal. One advantage inherent in using a configuration table is the availability of the system to be encoded on the fly by configuring, diagnosing, testing or by automatically building in self-test during normal operation (the well known ABIST concept). Two registers "Full#" and "Safety#" are integrated into the configuration table. Preferably there are flexible programmable registers in order to respond to market demand and manufacturer requirements in terms of security rules and rolling stock compliance. The "Full#" register represents the number of unexpected wheel turns limit before an uncontrolled movement is generated. This count is provided by the rolling stock manufacturer. The "Safety#" register counter represents the safety time limit that the parking brake can be locked before damage, and is also provided by the manufacturer.

CAN interface receiver (201) is also coupled to CAN decoders (202, 203, 204). Each decoder selects the appropriate information coming from CAN Network (100) to generate the necessary signals to be applied to SBRIS FSM controller (205). The signals then applied to the FSM are:

The Parking Brake signal (PB) which is issued from Parking Brake Decoder (204) when the parking brake is active or locked. As shown in FIG. 1 the activation of the parking brake can be issued from different commands such as the driver parking-brake shaft or from the driver parking-brake foot pedal which are connected to CAN Network (100).

The Engine signal (EN) which is issued from Power_train Decoder (203) when the engine is running.

The Driving Wheel signal (DW) which is issued from ABS Decoder (202) when the rolling stock is moving.

In a preferred implementation, each of these signals is set active on a positive pulse.

A 'CtKey' signal is also applied to SBRIS block (200). This input is a value which may be generated by the activation of the main contact key or another equivalent feature to provide information that the driver authorizes the rolling stock to run in case the park brake is not tightened. The format of the 'CtKey' signal can be issued either from CAN Network (100) and then decoded by a decoder 'CtKey_dec' (212) or from a standard point-to-point connection (namely a CtKey pin). The 'CtKey' activation gates a "Parking brake missing" mode when the parking brake is not locked and allows disabling SBRIS FSM controller system (205). In this way the driver is able to manipulate the rolling stock with no SBRIS interaction (i.e.: manually push or pull the rolling stock in case specific necessity). 'Ctkey' signal is not further described in this document and has to be considered as a constant datum.

The egress data flow propagates through a CAN interface driver (210) and its associated CAN Encoder (209), Engine Regulation block (206), Brake-by-Wire block (207) and the Driver information System block (208). Blocks 206, 207, and 208 are coupled to the SBRIS FSM controller system (205). CAN encoder (209) is directly coupled to Engine Regulation block (206), Brake-by-Wire block (207) and the Driver information System (208) to allow CAN format encoding of the respective signals before pushing them into CAN Network (100) via CAN Interface driver (210).

Engine Regulation block (206) controls the electronic throttle of the rolling stock. Directly activated by the "Alarm" signal (AL) issued from FSM block 206 monitors the engine slowing and stopping by using the same transmission as the electronic throttle. This allows modification of the engine speed with no impact on the transmission gas supply and its associated error reporting when diagnostic operation runs.

Brake-by-Wire block (207) controls the electronic wheel brake of the rolling stock. Directly activated by an Unexpected Movement signal (UM) and a Maintenance signal Maint, block 207 monitors the wheel brake stopping by using the same transmission as the electronic wheel brake. This allows stopping the rolling stock with no impact on the brake system and its associated error reporting when diagnostic operation runs.

Driver information block (208) registers the events associated with the wheel brake miss function. Directly activated by a Miss Park Brake signal (MPB) and the Maint signals, block 208 traces the brake events and miss function to its source and indicates to the driver that the brake system needs to be recovered by the car repair station. The "Driver Information" block (208) delivers the test sequences and information to be later read during the "Checking and Diagnosing" operation.

In operation, SBRIS controller system (205) receives a combination of the PB, EN and DW signals coming from the ingress data flow. SBRIS makes a comparison between the status of the "Full#" and the "Safety#" registers embedded in Configuration Table (211) and dynamic counters "Wheel_turn#" (not shown) and "Alarm#" (not shown) embedded in the FSM block and which status are directly linked to the rolling stock situation. The result of the comparison generate the safety signals Alarm (AL), Unexpected Movement (UM), Maint and Miss Park Brake (MPB) to be then managed by the egress data flow structure.

Generation of the Alarm Signal:

AL is applied to Engine Regulation block (206) to inform the system that a brake unreleased period overflow has been detected. A comparison is made between the "Safety#" register included in Configuration Table (211) and the incremental "Alarm#" counter embedded in SBRIS controller FSM (205). The "Alarm#" counter is incremented when the rolling stock is in critical situation and when the condition of PB active, EN active and DW active is met.

Generation of the UM and Maint Signals:

This case arises when the rolling stock is the 'park' condition and the parking brake has not been activated. In this case, UM is applied to "Brake-by-Wire" block (207) to generate an emergency brake action by activating the brake-by-wire mechanism which is inherent to the rolling stock. The Maintenance signal (Maint) simultaneously issued allows to inform the "Driver information" block (208) that the rolling stock is still moving under unexpected conditions.

Figure 3:
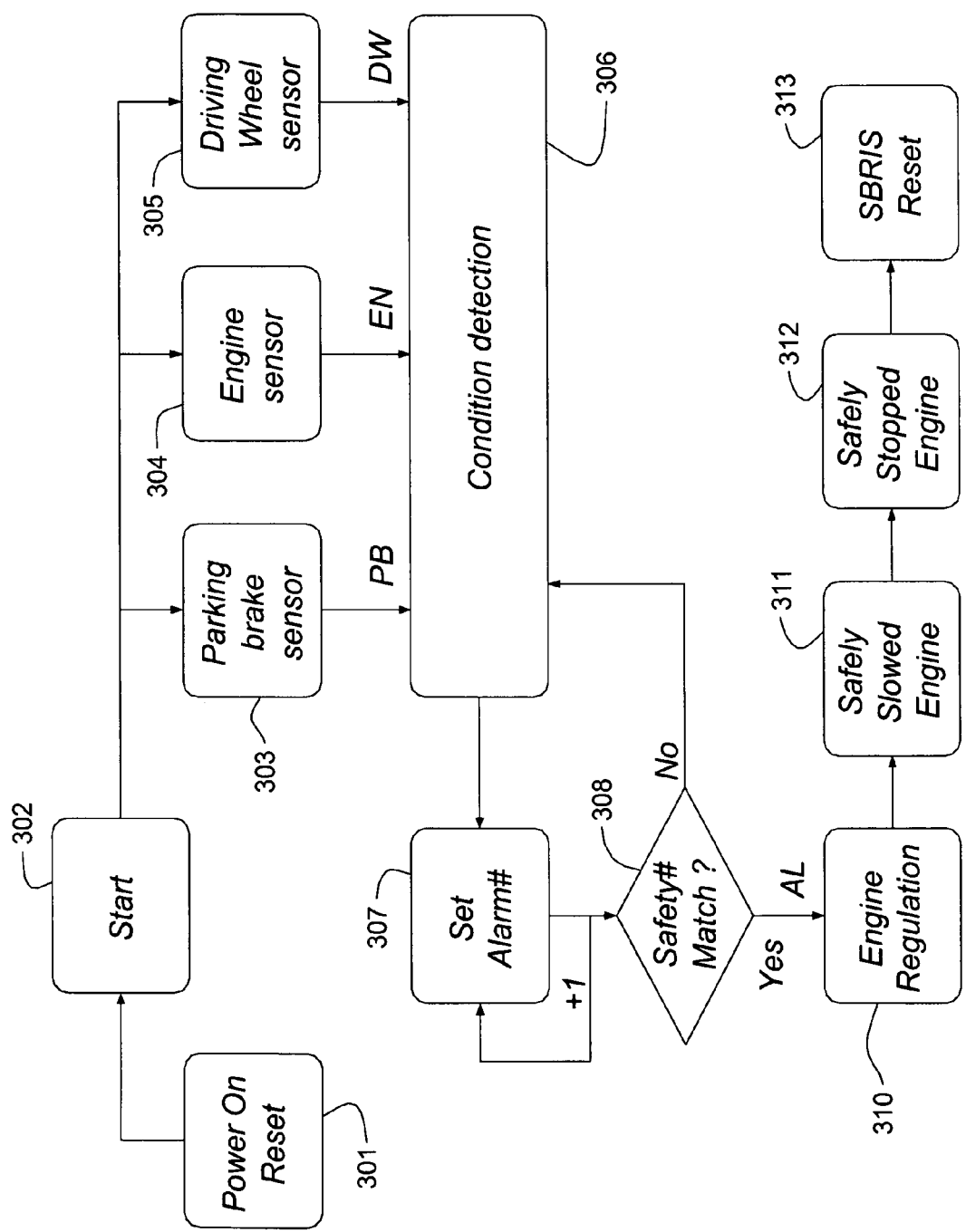
FIG. 3 is a flow chart illustrating the SBRIS operating process during a park brake release phase.

Referring to FIG. 3, the parking brake release phase is described, meaning that the rolling stock is in a "Start" condition.

Step 301 (Power On Reset) initializes all active elements of the SBRIS controller. Once the "Power On Reset" has been initiated the system is enabled to run.

A step 302 (Start) enables the dedicated sensors namely a "Parking brake" sensor (303), "Engine" sensor (304) and a "Driving Wheel" sensor (305) to deliver the respective "PB", "EN" and "DW" signals. These latter are then applied to a "Condition detection" block (306) to detect a 'Not released Parking brake' condition.

When PB is active (i.e., the parking brake is locked), EN is active (i.e., the engine is running), and DW is active (i.e. the rolling stock is moving), step 306 enables the "Alarm#" counter to count. In step 307, the Alarm# counter begins to count, which generates a count (in the Alarm# counter) during which the parking brake is locked while the engine is running and the rolling stock is moving.

Next in step 308, the status of the "Alarm#" counter is compared to the content of the "Safety#" register. The "Safety#" register comprises a predetermined time limit that the parking brake can be locked before being damaged. The count in the Alarm# counter is a count during which the parking brake is locked while the engine is running and the rolling stock is moving. In case of matching, AL is turned on to enable a "Engine Regulation" process step 310. Next, in step 311, a "Safely Slowed Engine" process operates until the engine stops. In next step 312, a "Safely Stopped Engine" process allows the rolling stock to be decelerated to a full stop. Finally, in step 313, the "SBRIS Reset" operation restores the system to be able to restart if necessary.

Figure 4:
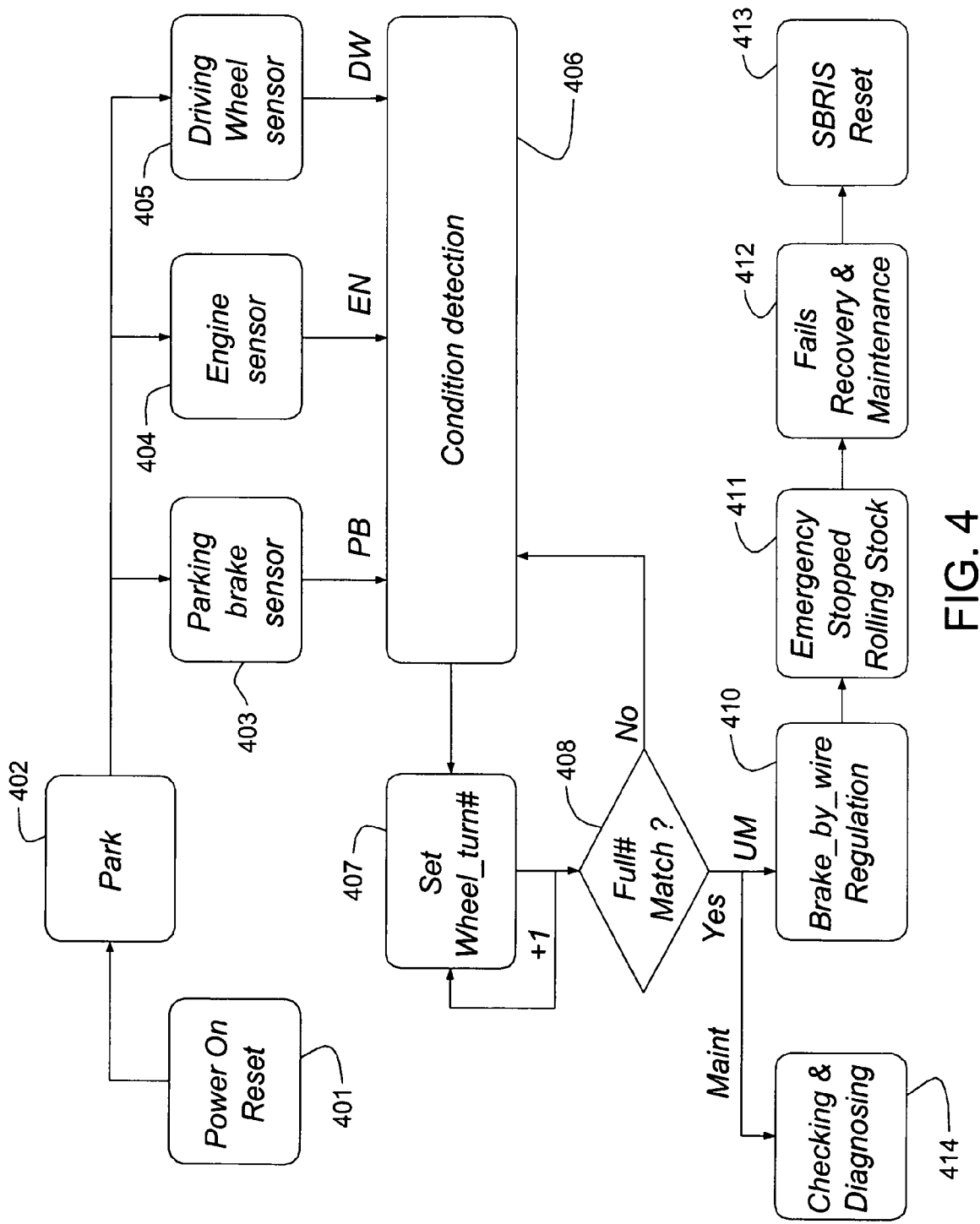
FIG. 4 is a flow chart illustrating the SBRIS operating process during a park brake unexpected movement phase.

FIG. 4 is a flow chart illustrating the SBRIS operation when the tightening of the parking brake is active, the engine is inactive and the rolling stock begins to run.

The Power on Reset step 401 initializes all active elements of the SBRIS controller. Once the "Power On Reset" has been initiated the system is enable to run.

Step 402 (Park) enables the previously mentioned dedicated sensors "Parking brake" (403), "Engine" (404) and "Driving Wheel" (405) to deliver the respective "PB", "EN" and "DW" signals to the "Condition detection" block (406).

Step 406 allows detection of the unexpected movement condition given by the combination of the "PB", "EN" and "DW" signals. The unexpected movement condition is met when "PB" is active, "EN" is inactive and "DW" is active. When the condition is met, the "Whell_turn#" counter begins to count in step 407.

Next in step 408, the status of the "Wheel_turn#" counter is compared to the content of the "Full#" register. In case of matching, the UM and the Maint signals are issued.

Next, two actions are set: the "Brake_by_wire Regulation" process is initiated in step 410 and the Maint signal is set in step 414 to inform the driver that a "Checking and Diagnosing" operation is mandatory before operation again. Some additional information may be provided to the driver through the activation of common features such as a blinking light or sound beeps.

Once the "Brake_by_wire Regulation" process has been initiated, a Brake_by_Wire stopping procedure is requested in step 411 until the rolling stock fully stops. In step 412, a "Fails Recovery and Maintenance" operation collects all the necessary log files to be provided to a repair center. Finally, in step 413, the "SBRIS Reset" operation restores the system to be able to restart if necessary.

Figure 5:
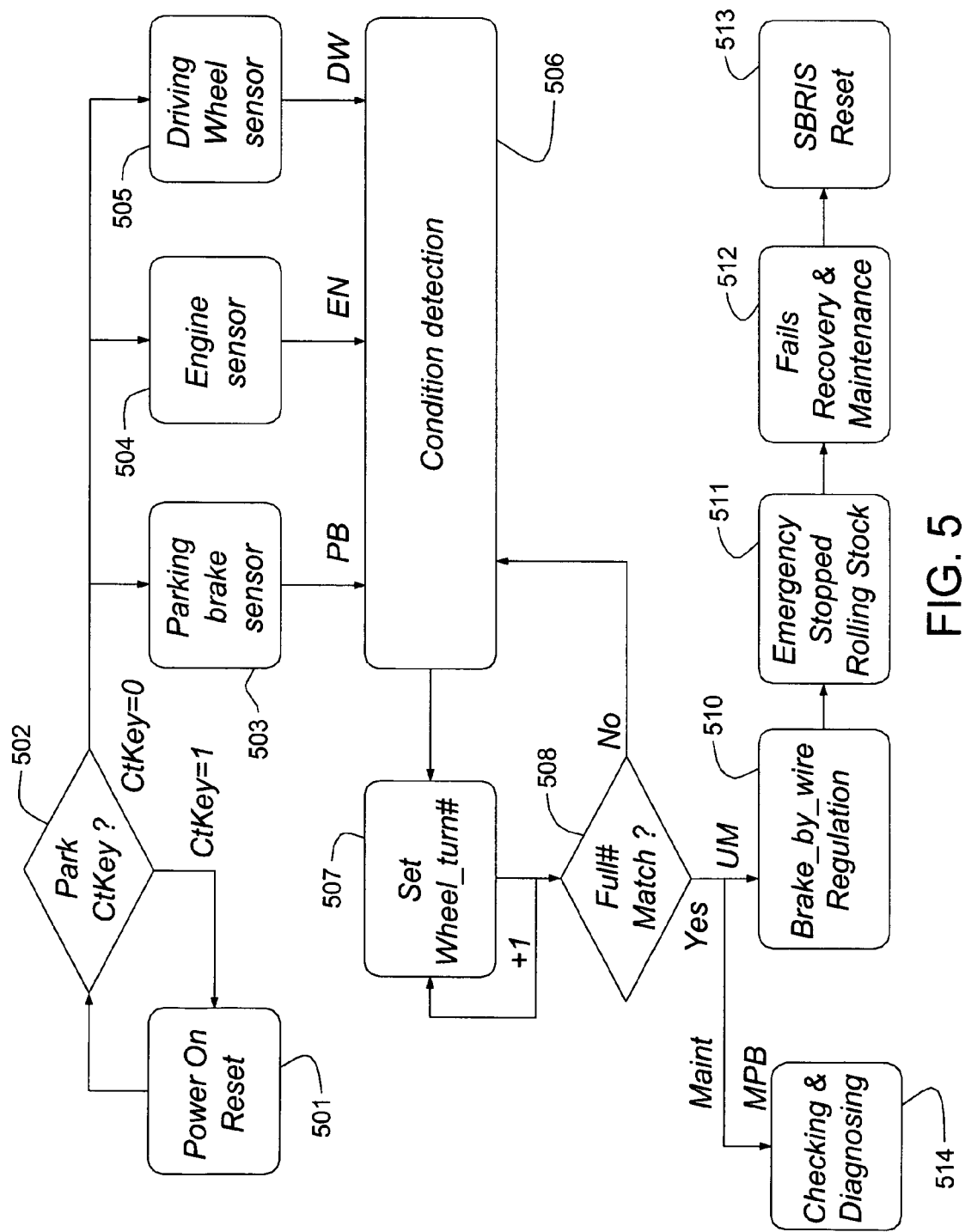
FIG. 5 is a flow chart illustrating the SBRIS operating process during a park brake missing locked phase.

FIG. 5 depicts the situation when the driver has conscientiously left the parking brake untightened (meaning that the rolling stock could be manually pushed for example).

Step 501 (Power On Reset) initializes all active elements of the SBRIS controller. Once the "Power On Reset" has been initiated the system is enabled to operate.

As previously explained, the "CtKey" signal is issued to SBRIS controller system (205). Step 502 (Park) allows to test the status of the "CtKey" signal to be tested. If "CtKey" is set (branch CtKey=1) the Parking Brake Missing process is disabled. If "CtKey" is not set (branch CtKey=0), the sensors "Parking brake" (503), "Engine" (504) and "Driving Wheel" (505) deliver the respective "PB", "EN" and "DW" signals to a "Condition detection" block (506).

Step 506 allows detection of the missing parking brake condition given by the combination of the "PB", "EN" and "DW" signals. The missing parking brake condition is met when "PB" is inactive, "EN" is inactive and "DW" is active. When the condition is met, the "Whell_turn#" counter begins to count in step 507.

Next on step 508, the status of the "Wheel_turn#" counter is compared to the content of the "Full#" register. In case of matching, UM, Maint and MPB signals are turned on.

Next, two actions are set: the "Brake_by_wire Regulation" process is initiated in step 510 and the "Maint" signal is set in step 514 to inform the driver that a "Checking and Diagnosing" operation is mandatory before operation again. Some additional information may be provided to the driver through the activation of common features such as a blinking light, sound beeps or klaxon.

Once the "Brake_by_wire Regulation" process has been initiated, a Brake_by_Wire stopping procedure is requested in step 511 until the rolling stock fully stops. In step 512, a "Fails Recovery and Maintenance" operation allows collection of all the necessary log files to be provided to a repair center. Finally, in step 513, the "SBRIS Reset" operation restores the system to be able to restart if necessary.

To summarize, the system of the present invention, based on automotive embedded electronic devices solutions, can be easily configured on the fly by a flexible architecture to satisfy both the business and the industrial requirements of:

the product, by providing quality, safety and reliability. Most of the parking brake problems are detected at the regular maintenance milestones of the rolling stock, rarely before. Statistics about unreleased parking brake show that there are not enough drivers that report they drove with unreleased parking brake during a significant period to damage the parking brake hardware;

the manufacturer by giving a significant cost reduction (an unique and simple solution is adaptable to a wide range of vehicle configuration), by meeting a fast process of the service integration, and by matching the global complexity and technology evolution; and the customer by apprehending the customer versatility demand, the car customization, the wide offering and the life cycle of the model generation.

While the invention has been described for a preferred embodiment, it is to be appreciated that various modifications may be made to the system and method herein described without departing from the spirit of the invention.

What is claimed is:

1. A method for controlling unintended rolling of a rolling stock, the rolling stock having at least a driver parking brake, an engine, a plurality of wheels and further having an in-vehicle network for signals transmission, the method comprising the steps of:

selecting among the signals transmitted over the in-vehicle network, a set of predefined signals;

analyzing the status of the selected signals to determine a regulation process to be applied to the rolling stock;

monitoring the regulation process;

detecting actuation of the driver parking brake and issuing a parking brake signal indicative thereof;

detecting the status of the rolling stock engine and issuing an engine signal indicative thereof;

detecting rotation of the plurality of wheels and issuing a wheels signal indicative thereof; and comparing a count of the parking brake to lock being locked while the engine is running and the rolling stock is moving, to a predetermined time limit that the parking brake can be locked before being damaged.

2. The method of claim 1 further including the step of decelerating the rolling stock if the predetermined time limit is exceeded by the count.

3. A system for controlling unintended rolling of a rolling stock, the rolling stock having at least a driver parking brake, an engine, a plurality of wheels and further having an in-vehicle network for signals transmission, the system comprising:

means for selecting among the signals transmitted over the in-vehicle network, a set of predefined signals;

means for analyzing the status of the selected signals and for determining a regulation process to be applied to the rolling stock;

means for monitoring the regulation process;

means for detecting actuation of the driver parking brake and means for issuing a parking brake signal indicative thereof;

means for detecting the status of the rolling stock engine and means for issuing an engine signal indicative thereof;

means for detecting rotation of the plurality of wheels and means for issuing an wheels signal indicative thereof; and means for comparing a count of the parking brake being locked while the engine is running and the rolling stock is moving, to a predetermined time limit that the parking brake can be locked before being damaged.

means for comparing a count of the parking brake being locked while the engine is running and the rolling stock is moving, to a predetermined time limit that the parking brake can be locked before being damaged.

4. The system of claim 3 further including means for decelerating the rolling stock if the predetermined time limit is exceeded by the count.

5. A computer readable medium for controlling unintended rolling of a rolling stock, the rolling stock having at least a driver parking brake, and engine, a plurality of wheels, and further having an in-vehicle network for signals transmission comprising instructions for:
  selecting among the signals transmitted over the in-vehicle network, a set of predefined signals;
  analyzing the status of the selected signals to determine a regulation process to be applied to the rolling stock;
  monitoring the regulation process;
  detecting actuation of the driver parking brake and issuing a parking brake signal indicative thereof;
  detecting the status of the rolling stock engine and issuing an engine signal indicative thereof;
  detecting rotation of the plurality of wheels and issuing a wheels signal indicative thereof; and
  comparing a count of the parking brake being locked while the engine is running and the rolling stock is moving, to a predetermined time limit that the parking brake can be locked before being damaged.

6. The computer readable medium of claim 5 further including instructions for:
  decelerating the rolling stock if the predetermined time limit is exceeded by the count.

* * * * *